(12) United States Patent
Kaneko

(10) Patent No.: US 7,031,017 B2
(45) Date of Patent: Apr. 18, 2006

(54) DATA PROCESSING SYSTEM, PRINTER, IMAGE RECORDING SYSTEM AND IMAGE RECORDING METHOD

(75) Inventor: Tadashi Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1100 days.

(21) Appl. No.: 09/752,553

(22) Filed: Jan. 3, 2001

(65) Prior Publication Data

US 2001/0021028 A1 Sep. 13, 2001

(30) Foreign Application Priority Data

Jan. 6, 2000 (JP) ............... 2000-005754
Dec. 28, 2000 (JP) ............... 2000-401556

(51) Int. Cl.
*G06F 15/00* (2006.01)
*G06K 9/00* (2006.01)

(52) U.S. Cl. ............... 358/1.2; 358/358; 358/1.5; 358/1.9; 358/296; 382/154; 382/201

(58) Field of Classification Search ............... 358/1.2, 358/1.9, 1.5, 296, 466, 488; 382/154, 276, 382/201; 345/427, 473
See application file for complete search history.

(56) References Cited

U.S. PATENT DOCUMENTS 6,483,939 B1 * 11/2002 Ochi et al. ............... 382/154

FOREIGN PATENT DOCUMENTS

| EP | 0 429 391 | 5/1991 |
|---|---|---|
| EP | 0 825 514 | 2/1998 |
| WO | WO 96/36955 | 11/1996 |
| WO | WO 97/10540 | 3/1997 |

OTHER PUBLICATIONS

European Search Report dated Dec. 8, 2003 (Ref. No. 2749830).
"Die Space Mouse bel der CAD-Arbeit", Carl Hanser Verlag, München, F&M Jahrg. 107 (1999) 3, pp. 64-65.
"Haptic Walkthrough Simulator: Its Design and Application to Studies on Cognitive Map", Hiroo Iwata, et al. (Jul. 1992), pp. 185 to 192.
"Virtual Perambulator: A Novel Interface Device for Locomotion in Virtual Environment", Hiroo Iwata, et al. (Apr. 1996), pp. 60 to 65.
European Search Report dated Mar. 1, 2001. (Ref. No. 2749830).

* cited by examiner

*Primary Examiner*—Twyler M. Lamb
(74) *Attorney, Agent, or Firm*—Fitzpatrick, Cella, Harper & Scinto

(57) ABSTRACT

The present invention provides easy operations of moving, rotating, magnifying, and reducing images displayed on a display screen attached to a computer by employing a selecting means. The selecting means having a function to communicate the computer via wireless means, which execute the following procedures to attains the objective of the present invention: detecting a relative position and a posture (a gradient) of itself, displaying the image on the screen in accordance with the moved position and the gradient, selecting the image displayed on the display attached to the computer and outputting (such as printing, etc.) the selected image.

15 Claims, 14 Drawing Sheets

DATA PROCESSING SYSTEM, PRINTER, IMAGE RECORDING SYSTEM AND IMAGE RECORDING METHOD

BACKGROUND OF THE INVENTION

1. Field of the Invention

The present invention relates to a data processing system to process image data in a virtual space, a printer, an image recording system, and an image recording method.

2. Brief Description of the Related Art

Actual scenery or portrait photo prints obtained from developing and printing images shot by conventional cameras have been widely used. However, recently digital cameras enable us to record and store scenery or portraits as image data, which can be printed by a printer afterward. Since video cameras and digital video cameras to shoot moving pictures have also been widely available, we can enjoy replaying moving pictures on monitor screens.

Quite recently, virtual reality systems where we can see scenery or experience various kinds of actions or behaviors in virtual spaces are introduced in research domains and amusement parks. However, until now, images in the virtual space can not be outputted by the above-mentioned actual cameras, digital cameras, video cameras and digital video cameras (these are defined as "image acquiring devices") because the image acquiring devices such as cameras, video cameras, etc., are means or systems to acquire optically inputted spatial information.

There are other means to acquire information in the virtual space as outputted data. Since images in the virtual space are originally accumulated as digital data and displayed on a monitor screen in a computer system and the like, it is possible to process or modify displayed information by utilizing a mouse and a pen-tablet.

However, before selecting a necessary area out of displayed image on the screen, icons, and tool bars, etc., have to be placed (displayed) in the computer screen for carrying out the following procedures: (a) Adjusting displayed portion on the screen, (b) Re-displaying enlarged- or reduced-sized image, and (c) Selecting a portion of displayed area. Due to these procedures, available space for display, namely the effective display area is decreased, or portions to be displayed are displayed implicitly under icons or tool bars, which results in poor maneuverability.

Keyboard operations to select a portion of the displayed screen are also troublesome, since several relevant keys allocated respective functions should be pressed according to a predetermined order.

Particularly in a 3-dimensional image display, the following complicated procedures are required.

(1) Since operations based on numerical coordinate data are required, they are far from intuitive ones.

(2) Since six parameters on position and rotated direction in 3-dimensional space are allocated to indicate 2-dimensional moving distance in a 2-dimensional plane by the mouse, more complicated operations are required.

Operations by the mouse or by the pen tablet fundamentally do not satisfy desires to experience virtual activities such as shooting scenery by the camera and the video camera.

The present invention is carried out in view of the above-mentioned problems. The objectives of the present invention are as follows.

(1) To provide a data processing system to select or enlarge target areas from image data in the virtual space.

(2) To provide a printer, an image recording system, and an image recording method to select or enlarge target areas and to set printing parameters on paper without any difficulties.

(3) Further to provide a system that realizes virtual experiences as if a person actually performs image-acquiring activities by using the camera and the video camera in the virtual space.

SUMMARY OF THE INVENTION

The data processing system, the printer, the image recording system, and image recording method according to the present invention are constituted as follows:

(1) The data processing system comprising: a data accumulating means to accumulate virtual space data as a set of 3-dimensional data on color, shape, dimension, and texture, etc., a coordinate system setting means to set a virtual reference point and virtual coordinate axes in the virtual space, a detecting means to detect a relative position and a gradient in a real space, a position specifying means to specify virtual positions in the virtual space in accordance with position data detected by the detecting means, an area selecting means to select a desired area in the virtual space in accordance with virtual positions specified by the position specifying means, and a storing means to store an image of desired area selected by the selecting means.

(2) The printer comprising: a data accumulating means to accumulate virtual space data as a set of 3-dimensional data on color, shape, dimension, and texture, etc., a coordinate system setting means to set a virtual reference point and virtual coordinate axes in the virtual space, a detecting means to detect a relative position and a gradient in a real space, and a printing means to print a desired area in the virtual space specified by position data detected by the detecting means and specified by the virtual reference point and coordinate axes.

(3) The image recording system comprising: a data accumulating means to accumulate virtual space data as a set of 3-dimensional data on color, shape, dimension, and texture, etc., a coordinate system setting means to set a virtual reference point and virtual coordinate axes in the virtual space, a detecting means to detect a relative position and a gradient in a real space, a position specifying means to specify virtual positions in the virtual space in accordance with position data detected by the detecting means, an area selecting means to select a desired area in the virtual space in accordance with virtual positions specified by the position specifying means, and a printing means to print the selected desired area in the virtual space.

(4) The image recording method comprising steps of: setting a reference point and coordinate axes in virtual space data as a set of 3-dimensional data on color, shape, dimension, and texture, etc., detecting a relative position and a gradient in a real space, specifying virtual positions in the virtual space in accordance with position data detected by the detecting step, selecting a desired area in the virtual space in accordance with virtual positions specified by the position specifying step and printing the selected desired area in the virtual space.

(5) Further, the data processing system comprising: a data accumulating means to accumulate virtual space data as a set of 3-dimensional data on color, shape, dimension, and texture, etc., a coordinate system setting means to set a virtual reference point and virtual coordinate axes in the virtual space, a virtual position detecting means to detect a relative position and a gradient against the virtual reference point, a moving means to move in the virtual space, an area selecting means to select a desired area in the virtual space in accordance with changed values due to the moving action of the moving means detected by the detecting means, and a storing means to store an image of the desired area selected by the selecting means.

(6) Constitutions according to (1) to (3) where the detecting means has a gyro-sensor.

(7) Constitutions according to (1) to (3) where the detecting means has an optical gyro-sensor and velocity sensors.

(8) Constitutions according to (1) to (3) where the detecting means has a laser light source, galvano-mirrors to distribute the laser light, prisms to reflect the distributed laser light, a photo-detector to receive the reflected light by the prisms and angle detectors to detect the respective moved angles of the galvano-mirrors.

(9) The image recording method according to (4) where a gyro-sensor is used at the detecting step.

(10) The image recording method according to (4) where an optical gyro-sensor and velocity sensors are used at the detecting step.

(11) The image recording method according to (4) where a laser light source, galvano-mirrors to distribute the laser light, prisms to reflect the distributed laser light, a photo-detector to receive the reflected light by the prisms and angle detectors to detect the respective moved angles of the galvano-mirrors are used at the detecting step.

(12) The constitution according to (5) where the moving means in the virtual space has rollers, a counting means to count rotated amount of the rollers, a controlling means to control rotating velocity of the rollers, supporting members formed monolithically with the rollers to support a heavy load, a measuring means to measure the load on the supporting members and a space adjuster to adjust a space between rollers and the supporting members in accordance with the measured load value by the measuring means.

(13) And, the constitution according to (5) where the moving means in the virtual space has a measuring member to measure the space between the rollers and the supporting members.

(14) Further the constitution according to (5) where a plurality of the moving means in the virtual space are arranged and have a function of the detecting means to detect the position in the virtual space.

DETAILED DESCRIPTION OF THE PREFERRED EMBODIMENTS

Figure 1:
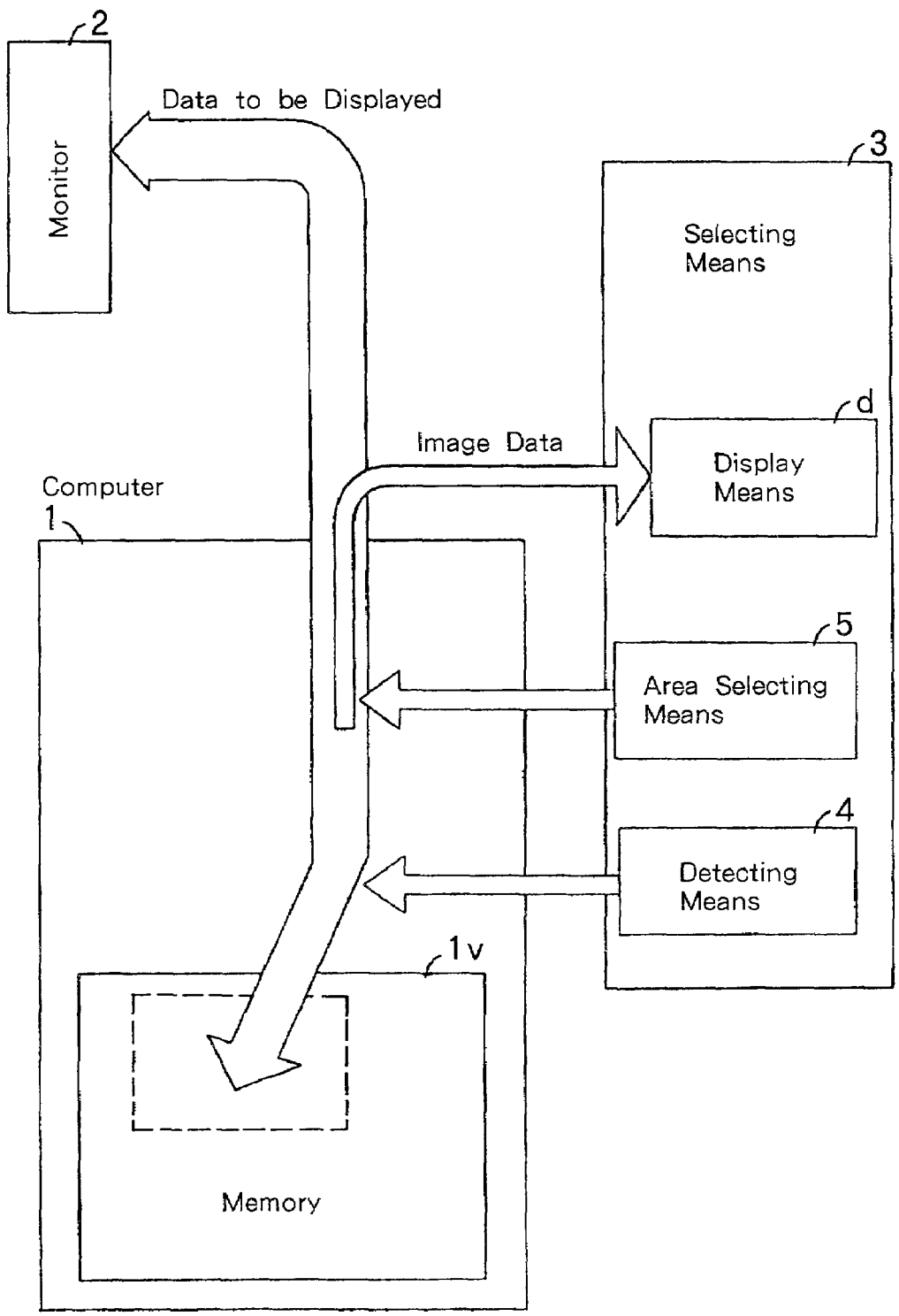
FIG. 1 is a block diagram illustrating a constitution of an image recording system according to the present invention.

FIG. 1 is a block diagram illustrating an outline of the constitution of the system to display and to output images displayed on a computer screen processed by the selecting means according to the present invention.

In FIG. 1, a numeric character 1 is a computer equipped with a display device 2 and a numeric character 3 is a selecting means. A numeric character 4 is a detecting means to detect a relative position and a status (gradient) of the selecting means 3 against a reference position. A numeric character 5 is an area selecting means to select a certain area on the above-mentioned computer screen according to changed values acquired from detected values by the detecting means 4 after moving the selecting means 3. An alphabetic character "d" is a display means to display the selected area. Reference character 1v represents a memory arranged in the computer 1, which can store image data for selection.

Hereinafter a principle of how to display moving consecutive images in response to the movement of the selecting means is described according to the present invention.

The selecting means 3 is equipped with the detecting means 4 to detect its posture and position and the display means d to display the selected area out of the image displayed on the screen D (FIG. 2) connected to the computer 1.

Hereinafter a 3-dimensional space to be processed by the computer 1 is defined as E. The selecting means 3 has a virtual reference point O and a virtual focus f fixed to itself. A virtual half line L starting from the virtual reference point O and a space field angle α, which determines a viewing angle to the virtual space E corresponding a displaying width of the display means d, are fixed to the selecting means 3.

The selecting means 3 memorizes the virtual reference point O as a central point o of the 3-dimensional space E and the half line L as a half line T based on the detected posture and position of itself, when the selecting means 3 is started or initialized. Values o and T are replaced new ones whenever the selecting means 3 is started or initialized and the posture against the virtual half line L is set to 0 degrees.

The detecting means 4 to detect the posture and the position of the selecting means 3 is arranged to measure a distance X between the reference point O and the point o; an angle Y formed by the virtual reference half line L and the half line T; and a self rotating angle Z around the virtual half line L. The selecting means 3 regularly transmits values X, Y and Z to the computer 1.

The screen D connected computer 1 is designed to display the image focused on a plane where the virtual reference point O is included, perpendicular to the axis of the lens with the virtual focus f, as if the lens is placed on the virtual reference point O toward the 3-dimensional area E. The display means d is arranged to display an area analogous shape to the image on the screen D, but rotated by the degree Z.

During moving operation of the selecting means 3, the virtual reference point is defined as O1. The virtual reference half line is defined as L1. The distance between O1 and o, the angle formed by L1 and the virtual half line T, and the self rotating angle around L1 are defined as X1, Y1, and Z1, respectively. At the end of the moving operation, the virtual reference point is defined as O2. The virtual reference half line is defined as L2. The distance between O2 and o, the angle formed by L2 and the virtual half line T, and the self rotating angle around L1 are defined as X2, Y2, and Z2, respectively.

During the moving operation, a calculated image on a virtual plane around Z1, where the virtual 3-dimensional space E is viewed at the angle $\alpha$ determined by the point o and the half line L based on a view point and an angle determined by the above-mentioned variables O1, X1 and Y1, is displayed on the display means d. The variables at the end of the moving operation are stored in the memory 1$v$ of the computer 1.

Once the moving operation is over, the image displayed on display means d is fixed and not influenced by fluctuations in posture or position of the selecting means 3. When the moving operation is started the selecting means 3 re-sets the center point o of the virtual 3-dimensional space E and the half line T so as to conform to respective variables O2, X2, Y2, and Z2.

The display means d is arranged to display only selected area or its alternative area displayed in the screen D. The shape of the selected or alternative area in the screen D corresponds to the analogous image in the display means d, but rotated by the self rotating angle Z.

A magnifying rate of the image on the screen D connected to the computer is set in proportion to a value, X1+$\alpha$ divide by $\alpha$. Here $\alpha$ is a predetermined value against the image at starting or initializing operation of the selecting means 3.

A plane where the point o is included and normal to the half line T is defined as a plane P. A point where the plane P and the virtual reference half line L1 cross is defined as a point o1. The center of the image displayed on the screen D corresponds to the point o1, when the center point of the image in the screen D at starting or initialization of the selecting means 3 is set on the point o.

Once the moving operation is finished, displayed contents on the screen D connected to the computer 1 and display means d of the selecting means 3 are fixed.

It is needless to say that the same principle employed for the 3-dimensional image explained above is applied to the 2-dimensional image.

Figure 2:
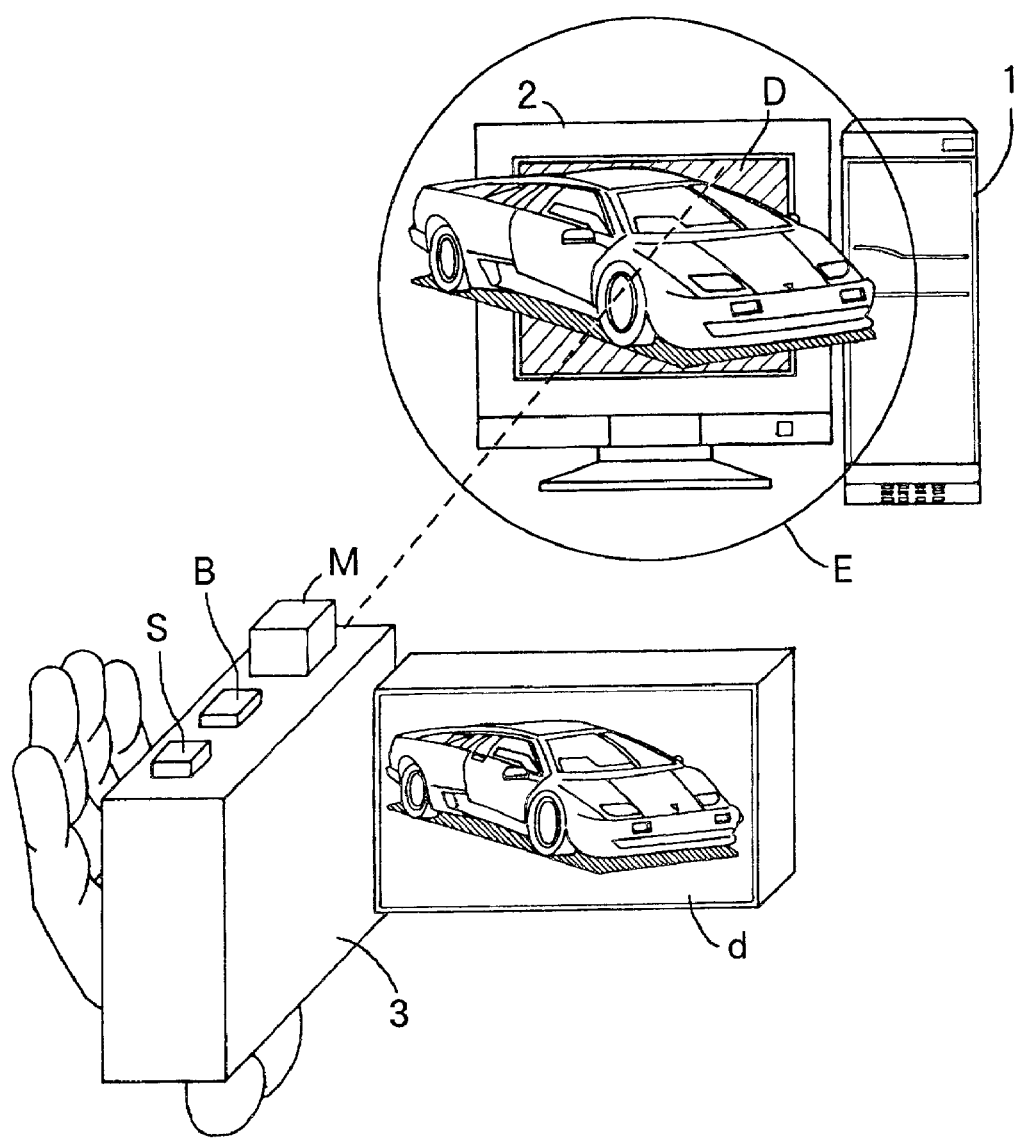
FIG. 2 is a schematic view illustrating a first embodiment according to the present invention.

FIG. 2 shows a schematic view of the first embodiment according to the present invention where the virtual space area having a predetermined relation between the screen D of the computer 1 and the display means d of the selecting means 3. In the figure a car is displayed. An optical gyrosensor and three velocity sensors arranged perpendicularly to each other are equipped in the main body of the selecting means 3 so as to measure changed values in posture and position of the selecting means 3. Measured values are regularly transmitted to the computer 1 via a wireless transmission (not shown). The display means d, a liquid crystal display (Hereinafter referred to as "LCD") is attached to the main body of the selecting means 3. The LCD d is movably fitted to the main body of the selecting means 3 via a hinge. The LCD d can be folded up to a position parallel to the main body of the selecting means 3. The LCD can be fitted at any angle between 0 where the LCD is parallel to the plane of FIG. 2 and 90 degrees where the LCD is perpendicular to the plane.

The LCD attached to the selecting means 3 is a display screen for a second computer equipped in the selecting means 3. When the second computer is started, it measures the position and the posture of the selecting means 3 by the aid of the gyro-sensor and velocity sensors after receiving the virtual 3-dimensional space data of the computer 1. The measured results are transmitted to the computer 1 and are used for simulating images seen through the virtual lens with focus f aligned with the light axis of the selecting means 3 shown in FIG. 2 by the aid of a software. Simulated images are displayed on the display means d of the selecting means 3.

When a button M is pushed within one second, it functions as a changeover switch for the screen D connected to the computer 1 from a still screen to a motion screen in accordance with the movement of the selecting means 3 or vice versa.

When the button M is pushed more than one second or a power source (not shown) begins supplying power, the posture and position of the selecting means 3 is memorized after initializing the selecting means 3.

At the initialization of the selecting means 3, a 2-dimensional still image with 600 pixels down and 800 pixels across out of 3000 pixels by 4000 pixels is displayed on the screen D of the computer 1. An image with 300 pixels by 400 pixels having the same center point as the 2-dimensional still image is displayed on the LCD display means d as image data area for editing by the computer afterward.

At first, the selecting means 3 is initialized by pressing the button M more than one second by facing the selecting means toward the center of the screen D so that the posture and position are memorized.

Hereinafter a mode to display moving images switched by pushing the button M within one second is explained. When a button B is pushed or the selecting means 3 is moved closely to the screen D, magnified images are displayed on the screen D and on the display means d. When a button S is pushed or the selecting means 3 is moved apart from the screen D, reduced-sized images are displayed on the screen D and on the display means d. Predetermined magnifying and reducing rates are memorized in the computer 1 beforehand. When the button B or the button S is pushed for two seconds, the image is magnified two times or reduced to one half of the original one respectively.

When a distance between the selecting means 3 and the screen D is changed, displaying magnified rate on the screen D and the LCD d is set as a value of (X+$\alpha$)/$\alpha$; where X is a distance between the center of the gravity of the selecting means 3 at the initialization and that of the present time. The character $\alpha$ is the predetermined value memorized in the selecting means 3.

Figure 3:
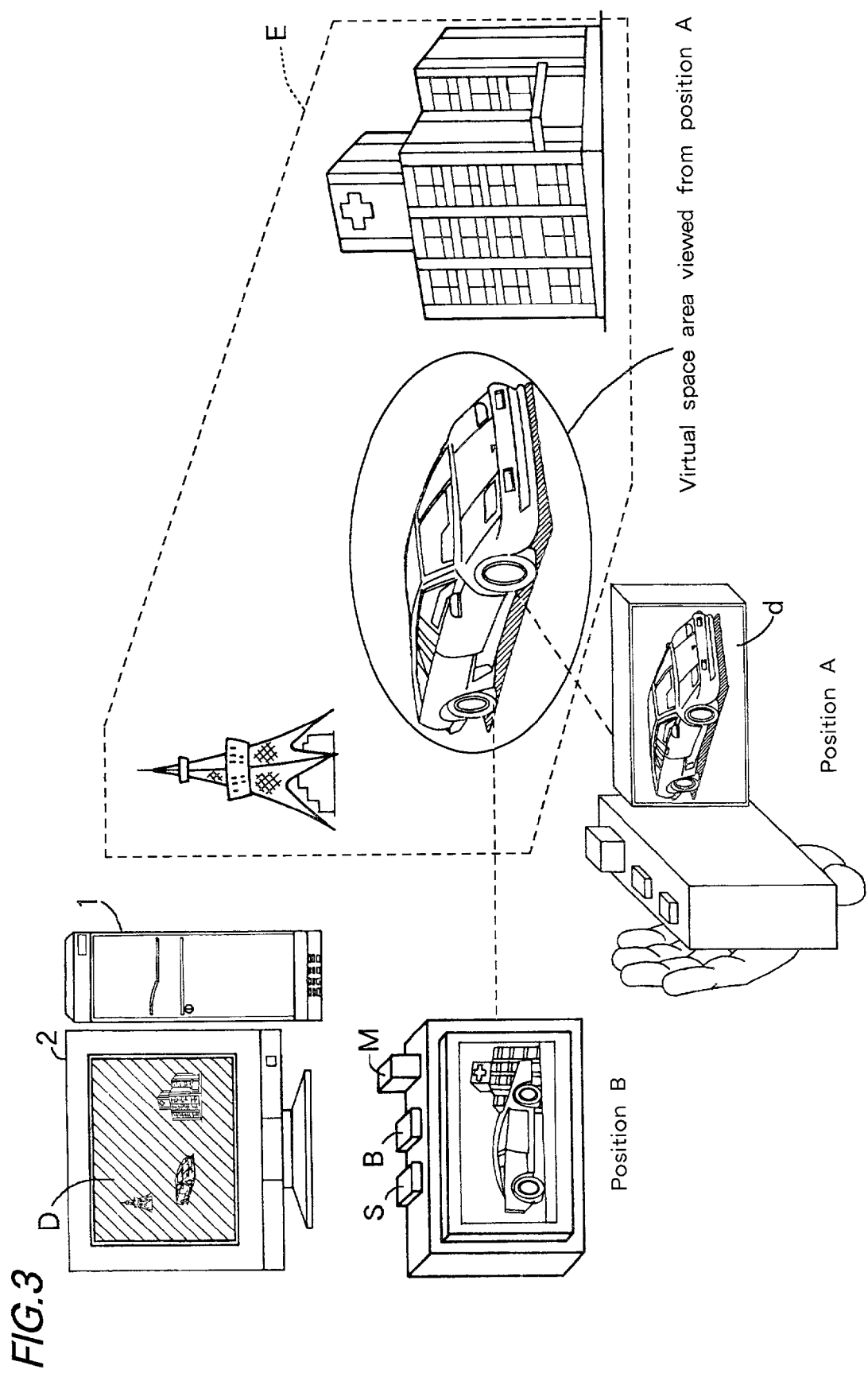
FIG. 3 is an explanatory view showing a first operational movement of the first embodiment.

Other functions during the moving mode are explained by referring FIG. 3. The screen D in FIG. 3 shows a moving mode switched by the button M in FIG. 2. A broken line in FIG. 2 is a virtual vector that goes through the center of the gravity of the selecting means 3 and its relative position to the virtual vector is always fixed.

During the moving mode, when the selecting means 3 is moved parallel to a position A or B in FIG. 3, a point where the present virtual vector fixed to the selecting means 3 meets a plane; where the center of the gravity of the selecting means 3 is placed, perpendicular to the virtual vector fixed to the selecting means 3 at the initialization is functioned as a center of the area with 300 pixels by 400 pixels displayed on the display means d for the selection. When the button is pushed again, it is changed to the still mode where the displayed image is fixed as the selected image.

Figure 4:
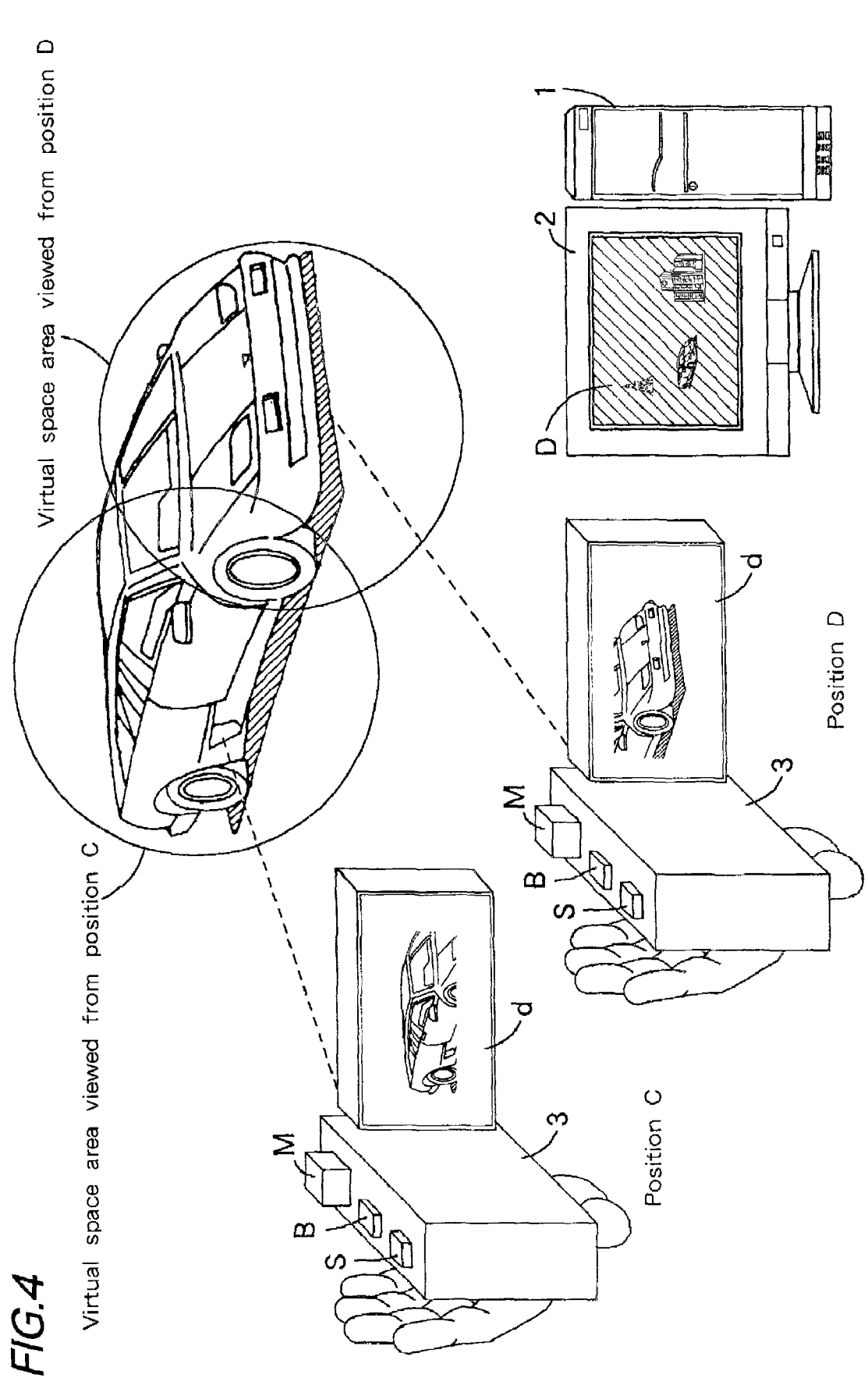
FIG. 4 is an explanatory view showing a second operational movement of the first embodiment.

FIG. 4 is the schematic view for explaining the selecting means 3 that is moved from a position C to D parallel to a light axis. At the C position the LCD d of the selecting means 3 displays only rear part of the car, while at the position D the LCD d displays the whole body of the car so that the movement of the image in the virtual space is understood intuitively. The screen D of the computer 1 and LCD d display the same results, but the LCD d displays a partial image while the screen D displays the whole image.

Figure 5:
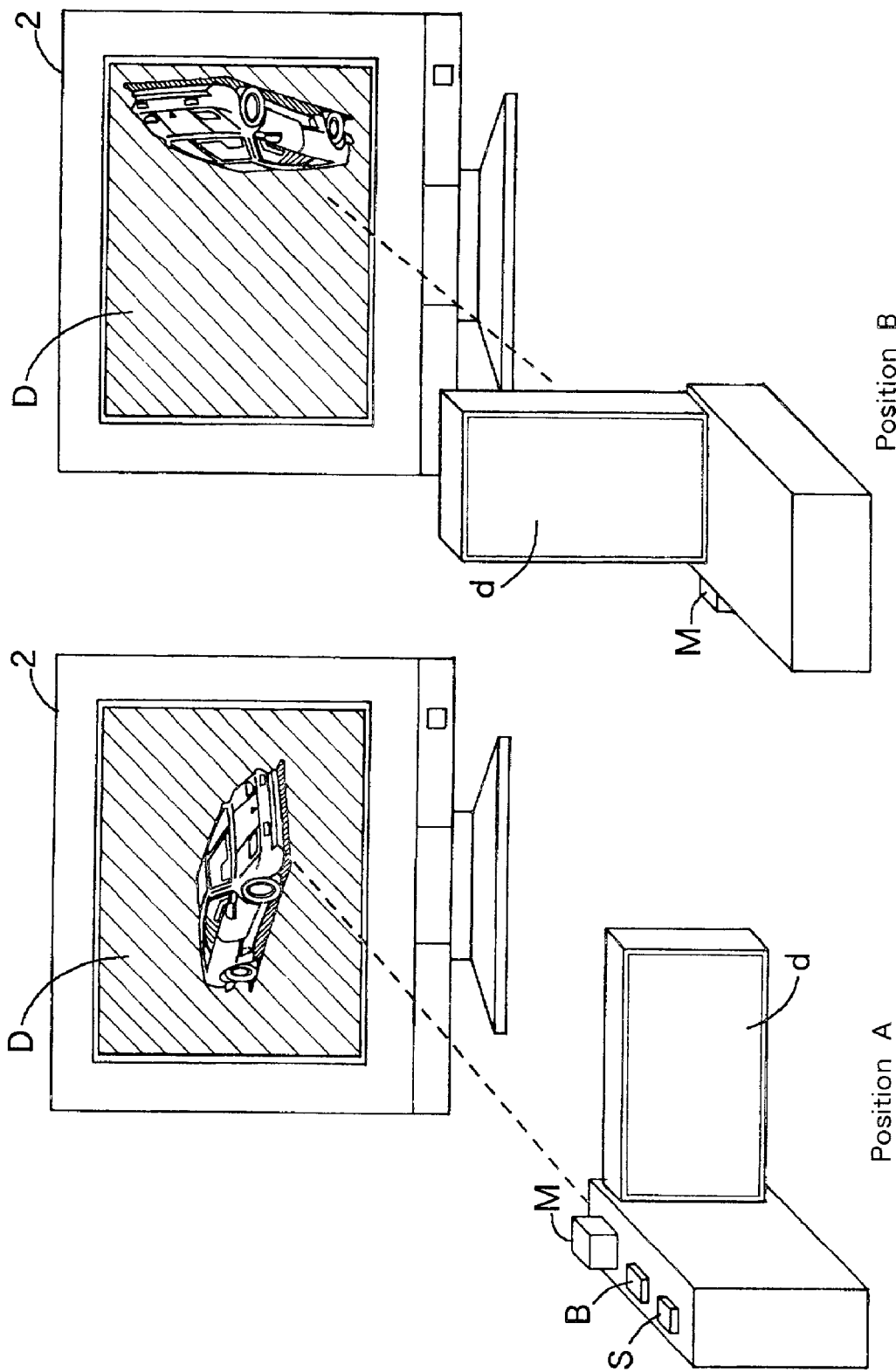
FIG. 5 is an explanatory view showing a third operational movement of the first embodiment.

During the moving mode, when the selecting means 3 rotates by a degree a from a status A to a status B as shown in FIG. 5, the image area for printing displayed on the screen D also rotates by the degree a where selective image data area having the same center point as the 2-dimensional image on the screen D when a is 90 degrees, corresponds to data area with 300 pixels by 400 pixels.

The relation between displayed image selected by the selecting means 3 and the selecting means 3 is arranged in a quite similar way to a relation between a printed photograph and a 35 mm film camera, which enables the selecting means to operate intuitively as the 35 mm film camera.

If the present posture and position of the selecting means 3 is in an area outside for selecting operation, the present mode is kept until the posture and position return to operative area.

Figure 6:
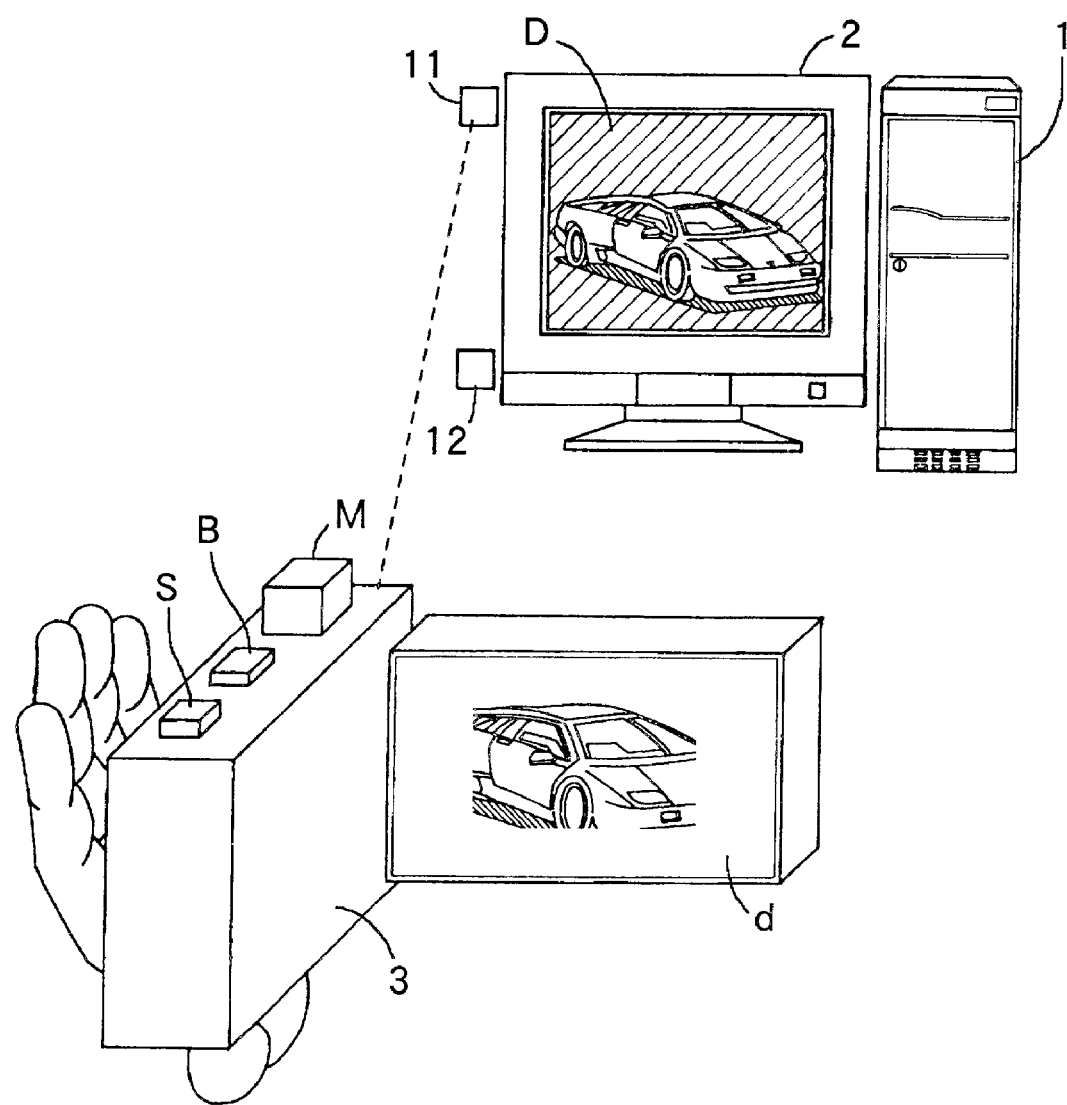
FIG. 6 is a schematic view illustrating a second embodiment.

FIG. 6 is a schematic illustration of the second embodiment according to the present invention. In this embodiment, a combination of a laser light source, a photo-detector for the laser light, two galvano-mirrors to reflect the laser light so as to scan the area 2-dimensionally, and two angle detectors for each galvano-mirror are employed in place of the combination of the photo-gyro-sensor and velocity sensors as in the embodiment 1. Around the periphery of the screen D, two corner cube prisms 11, 12 are fixed so as to reflect the laser light from the selecting means 3 and to return the laser light to the photo-detector of the selecting means 3. Based on two angle values detected by two angle detectors attached to the selecting means 3, directions of the two corner cube prisms are measured. A position of the screen D against the virtual 3-dimensional space is calculated based on the measured directions and the distance between two corner cube prisms 11 and 12.

Figure 7:
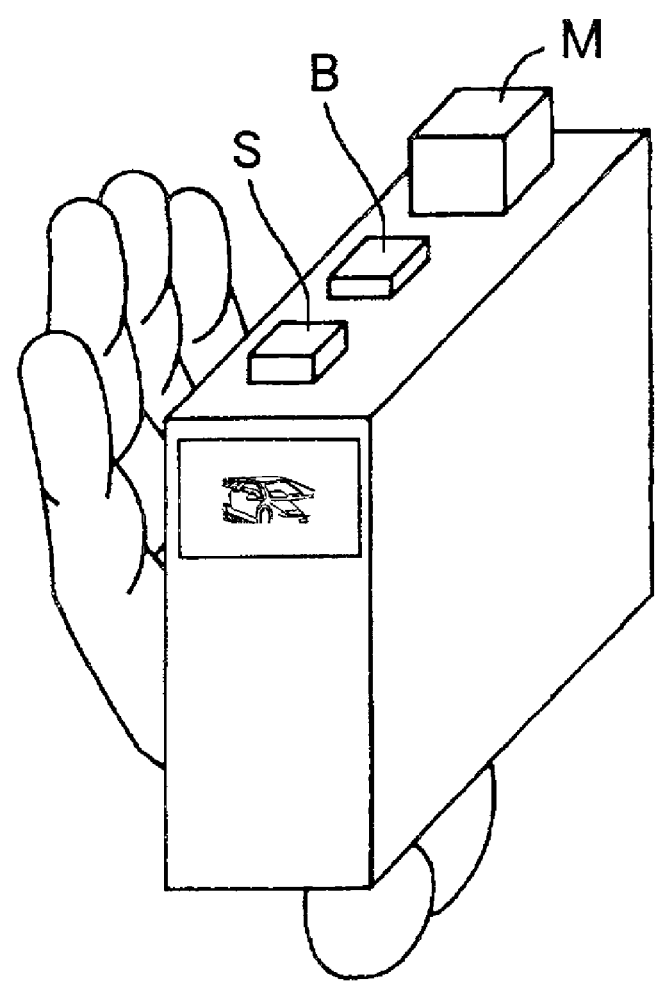
FIG. 7 is a schematic view illustrating a third embodiment.

FIG. 7 is a schematic view of the third embodiment of the selecting means 3 according to the present invention. Since the constitution of this embodiment is same as the preceding embodiments except a finder for monitoring the image attached to the selecting means 3 instead of the display means d, further explanation is omitted.

It is needless to say that operating methods and functions in 3-dimensional space described above are also applicable to the 2-dimensional space.

Figure 8:
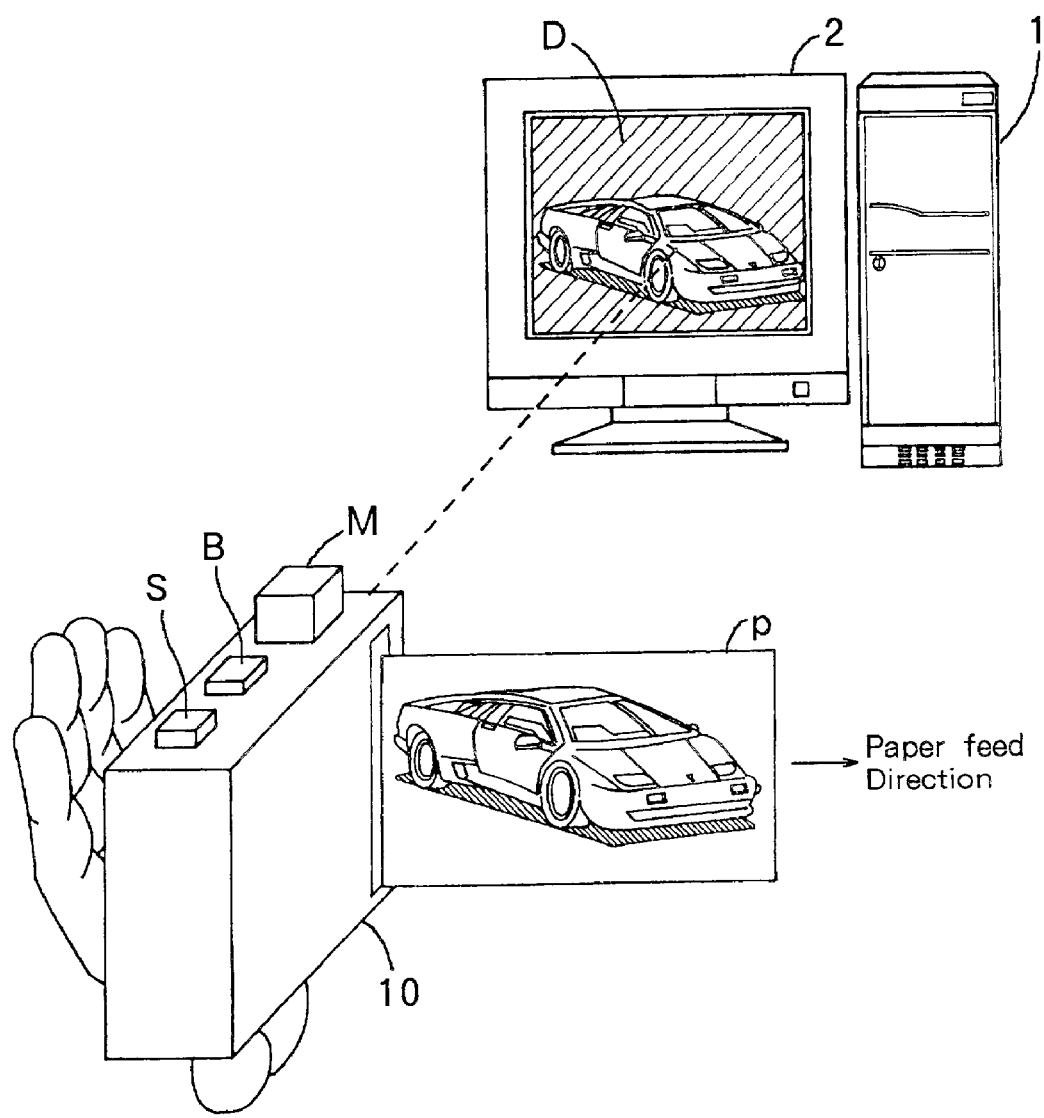
FIG. 8 is a schematic view illustrating a fourth embodiment.

FIG. 8 is a schematic view of the fourth embodiment of the present invention. In this embodiment, a printer 10 equipped with the same functions as of the selecting means 3 in the preceding embodiments is employed in place of the selecting means 3. Since procedures are quite similar to the preceding embodiments except printing selected images in color or monochrome, further detailed explanation is omitted. In this embodiment the display means d is replaced by a paper p. Due to functions of the present invention, a printing direction, crosswise or downward, can be monitored on the display screen beforehand without any difficulties. Thus, the selecting of images before printing is executed more easily than before.

Figure 9:
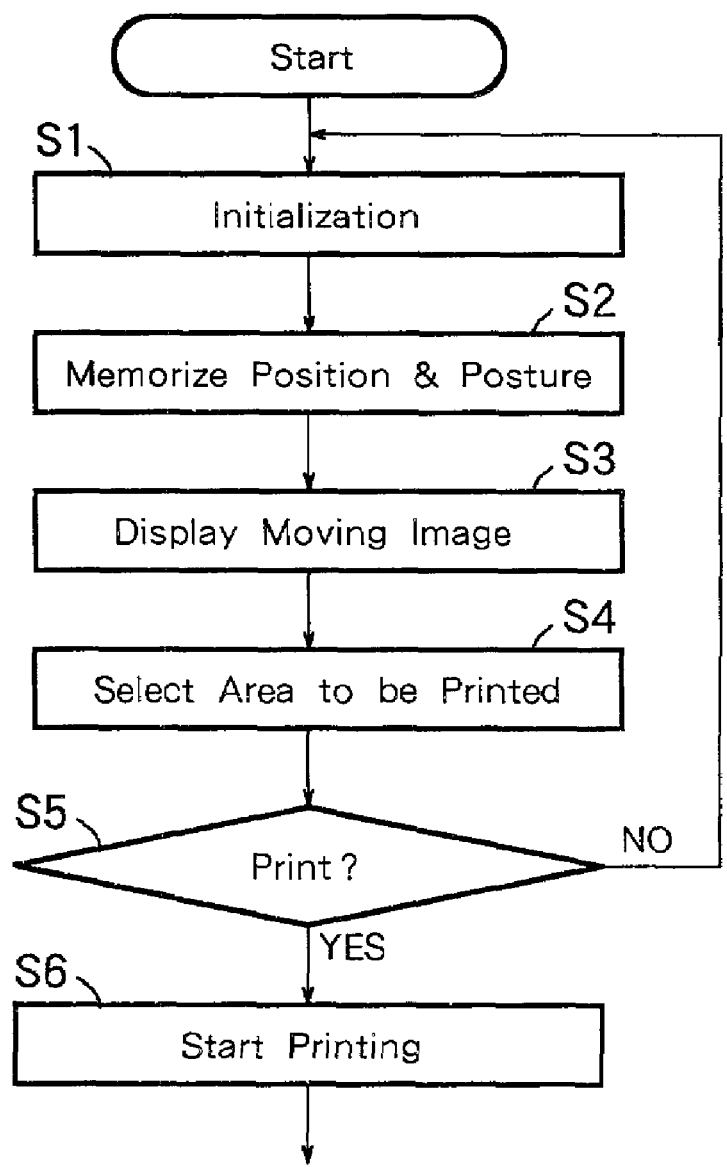
FIG. 9 is a flow chart showing an operational procedure of the fourth embodiment.

FIG. 9 is the flow chart depicting a basic operation of the fourth embodiment. Controlling procedures depicted in the flow chart are executed by a program stored in a CPU (not shown) equipped in a controller of the printer 10.

Before printing, the printer 10 is initialized (S1) and the position and the posture of the printer 10 is stored in a memory (not shown) (S2). A processed image, namely an enlarged or a reduced-sized image is displayed (S3) on the screen D of the display device 2. The area for printing is selected out of the displayed image by moving the printer 10 (S4). When a printing operation is selected (S5), the recording procedure starts (S6).

Figure 10:
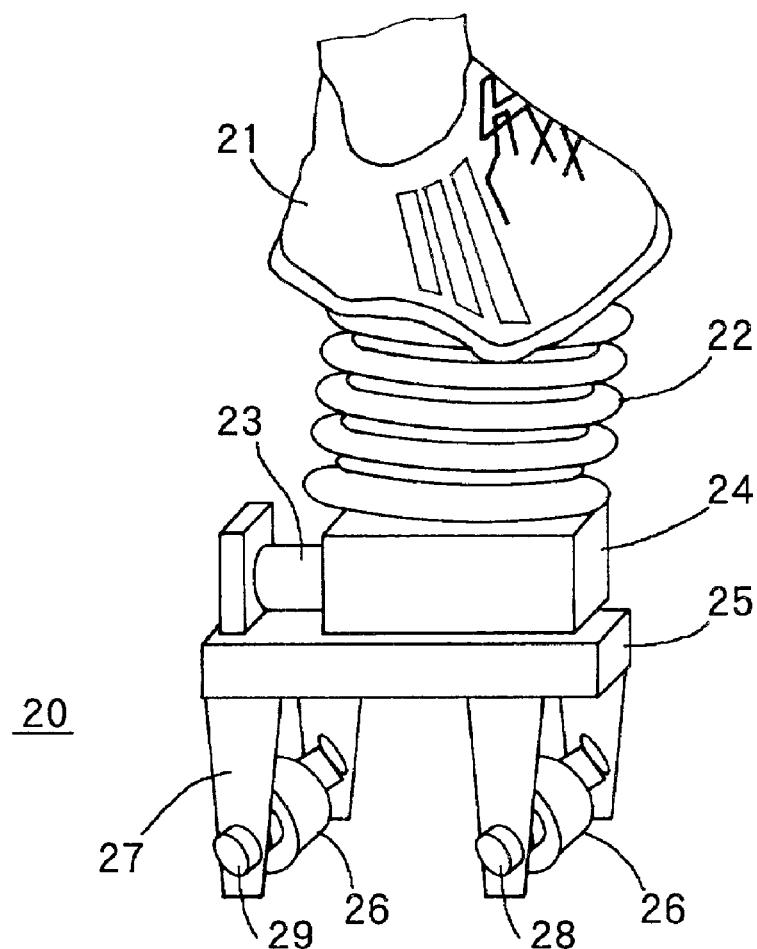
FIG. 10 is an explanatory view showing a roller skate employed in a fifth embodiment.

FIG. 10 is a schematic view illustrating the fifth embodiment according to the present invention where a roller skate is used as a moving means and a detecting means to detect a moved distance in the virtual space.

Figure 11:
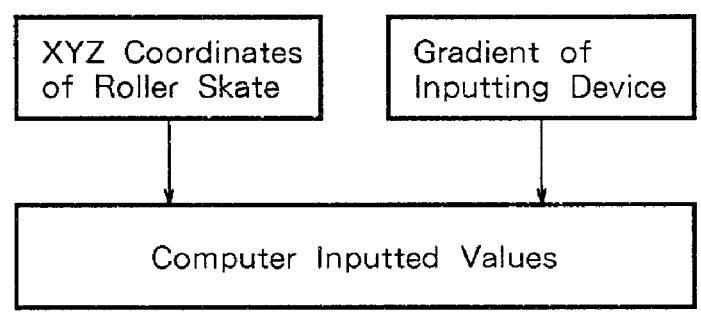
FIG. 11 is an explanatory diagram explaining a movement in a virtual 3-dimensional space.

FIG. 11 is a block diagram to explain movements of a person in the virtual 3-dimensional space, who has the selecting means shown in FIG. 2 and wears the roller skate shown in FIG. 10.

Hereinafter operations and functions of a roller skate 20 are explained.

Sports shoe 21 is supported by expandable bellows 22, to which air pump 23 is connected via a connecting member 24 so as to control the quantity of air in the bellows 22. The connecting member 24 is supported by a supporting board 25, to which two rollers 26 are fixed via roller supporting members 27. An encoder 28 is attached to the front roller and a motor 29 is attached to the rear roller. In the connecting member 24, the following devices are accommodated: a load gauge, a controlling circuit for controlling the encoder 28/the motor 29, a controlling circuit for controlling the air pump 23, and a wire-less communication means for mutual transmission/receipt of encoded values in the encoder and of pressure values in the bellows between the two roller skate shoes.

Hereinafter respective postures of a roller skater are defined as follows. A: A posture immediately before walking where the left shoe is positioned rear, B: A posture immediately after walking where the left shoe is raised from the ground. C: An instant the left shoe touches the ground at front position of the right shoe. D: A posture after the left shoe touches ground where a weight of the skater is shifting from the right shoe to the left shoe.

A': A posture immediately before walking where the right shoe is positioned rear. B': A posture immediately after walking where the right shoe is raised from the ground. C': An instant the right shoe touches the ground at the front position of the left shoe. D': A posture after the right shoe touches ground where a weight of the skater is shifting from the left shoe to the right shoe. When a certain posture among the postures A to D' explained above is kept for a predetermined duration, that posture is defined as E.

A posture is specified as A, B, C, D, A', B', C', D' or E, according to a load difference between the right and left shoes and the duration of the same posture.

Defined postures are determined according to average load values on the right and left shoes at a standing posture for 10 seconds.

More specifically in the case of a person who is 157 Cm tall and weighs 49 Kg, a present posture, D or D' is determined as follows. The average weighed values for 10 seconds on the right and left at the standing posture are 24 Kg and 25 Kg respectively. After adding ±10% allowance value to the weighed values, digits less than the decimal point are cut off to obtain integers. Values plus/minus 2 Kg are ranges for D and D' postures.

Namely, the posture D is specified as follows: the load on the left is more than 22 Kg and less than 24 Kg, while the load on the right is more than 25 Kg and less than 27 Kg. The posture D' is specified as follows: the load on the left is more than 24 Kg and less than 26 Kg, while the load on the right is more than 23 Kg and less than 25 Kg.

The posture B is specified as the load on the right exceeds 90% of the weight, i.e., more than 44 Kg. While the posture B' is specified that the load on the right exceeds 90% of the weight, i.e., more than 44 Kg.

The posture C is defined as the posture after the posture B is over. The posture C' is defined as the posture after the posture B' is over. The posture A is defined as the posture after the posture D' is over. The posture A' is defined as the posture after the posture D is over.

When each posture keeps its status for 0.2 second within 5% margin of its load fluctuation, the posture is defined as E. The following posture after E whether it is B, B', D or D', is determined in accordance with predetermined conditions.

The rollers 26 rotate to meet a rotating velocity obtained from a predetermined stride and walking velocity. Here the stride is set 60 Cm and the initial velocity is set 2.4 Km/Hr. beforehand.

The air in the bellows 22 is discharged by the air pump 23 during walking on a flat plane so as to keep a distance between the grounding surface of the roller 26 and the sole of the shoe 21 constant. At walking postures B and B' on the flat plane, the roller motor 28 of the more loaded roller skate is controlled by a rotating number of the encoder 27 so that the more loaded roller skate moves backward by a distance corresponding to the stride. At the posture B in case the walking movement is too fast to move backward completely, the right and left roller motors rotate so as to compensate the unfilled moving distance during postures C, D and A'. Rotating velocity of the following posture B' is determined by the stride and duration of the posture B.

At the posture B' in case the walking movement is too fast to move backward completely, the right and left roller motors rotate so as to compensate the unfilled moving distance during postures C', D' and A. Rotating velocity of the following posture B is determined by the stride and duration of the posture B'.

At the posture B during the walking movement on an ascending slope, air is pumped into the bellows 22 of the left roller skate 20 by the air pump 23 so as to attain a maximum height while air in the bellows 22 of the right roller skate 20 is discharged by the air pump 23 so as to attain minimum height. At the posture B' during the walking movement on the ascending slope, the air pumps function reciprocally to the posture B. In these cases the rotating number and the rotating velocity are same as the case of walking on the flat plane.

At the posture B during the walking movement on a descending slope, air in the bellows 22 of the left roller skate 20 is discharged by the air pump 23 so as to attain a minimum height while air is pumped into the bellows 22 of the right roller skate 20 by the air pump 23 so as to attain maximum height. At the posture B' during the walking movement on the descending slope, the air pumps function reciprocally to the posture B. In these cases the rotating number and the rotating velocity are same as the case of walking on the flat plane.

A walking movement whether on the flat plane, on the ascending slope or on the descending slope is selected by a changeover switch (not shown in figures). The sports shoes 21 can be replaced by sandals, leather shoes, etc., as far as they are able to fit to the roller skates. Sports shoes having compartments under the soles to accommodate sand and pebbles are one of the modifications to feel real walking on the ground. Variable gradients on the ascending or descending slope are attained by adjusting extending lengths of bellows 22 according to measured extending lengths and by controlling rotating numbers by the motors 29 according to the rotating numbers of the encoders 28.

Hereinafter referring FIG. 11, functions when the roller skater on the roller skates 20 explained in FIG. 10 having the selecting means 3 shown in FIG. 2, moves in the 3-dimensional virtual space are explained.

By the constitution shown in FIG. 1, the gradient against the reference position of the selecting means 3 is detected. The relative position against the reference position in the 3-dimensional virtual space is detected by the roller skates 20, which realizes the function of the detecting means 4 in FIG. 1. Also the constitution shown in FIG. 11 realizes the function of the detecting means 4 shown in FIG. 1 by adding the detected position value of the selecting means 3 against the reference position to the relative position value of the roller skates 20 against the reference position in the 3-dimensional virtual space.

In this embodiment a constitution where moving in the 3-dimensional virtual space on the roller skates using the printer 10 shown in FIG. 8 instead of the selecting means 3 shown in FIG. 2 is also another possible alternative.

Figure 12:
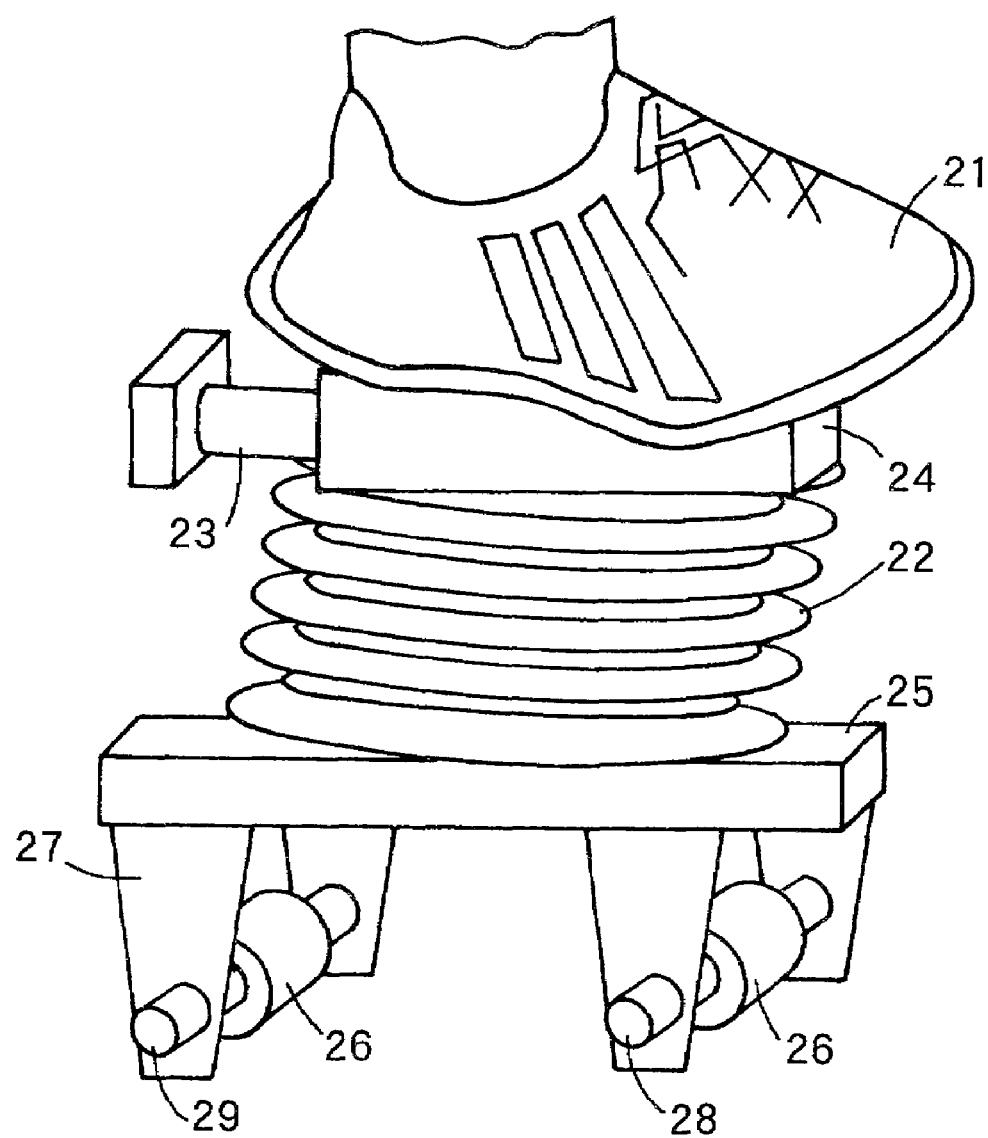
FIG. 12 is an explanatory view showing a roller skate employed in a sixth embodiment.

FIG. 12 is an explanatory view to showing a roller skate as moving means and detecting means to detect the movement in the virtual space in the embodiment 6. A different feature from the embodiment 5 is that the sports shoe 21 is supported by the connecting member 24, and the connecting member 24 is supported by the expandable bellows 22.

Figure 13:
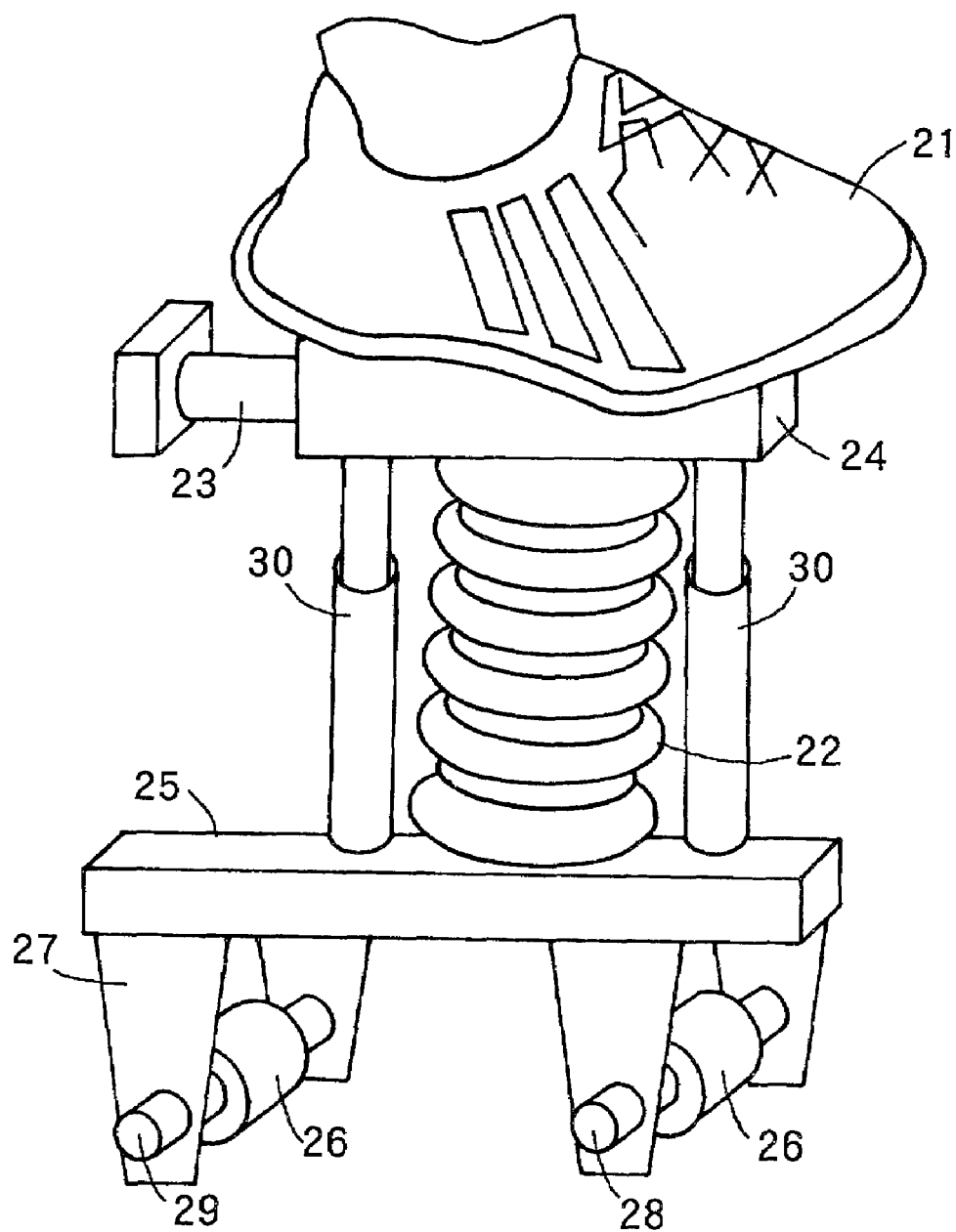
FIG. 13 is an explanatory view showing a roller skate employed in a seventh embodiment.

FIG. 13 is an explanatory view showing a roller skate as moving means and detecting means to detect the movement in the virtual space in the embodiment 7. A different feature from the embodiment 5 is that supporting rods 30 are arranged so as to support load on declining side of the bellows 22 by adjusting lengths of the supporting rods.

Figure 14:
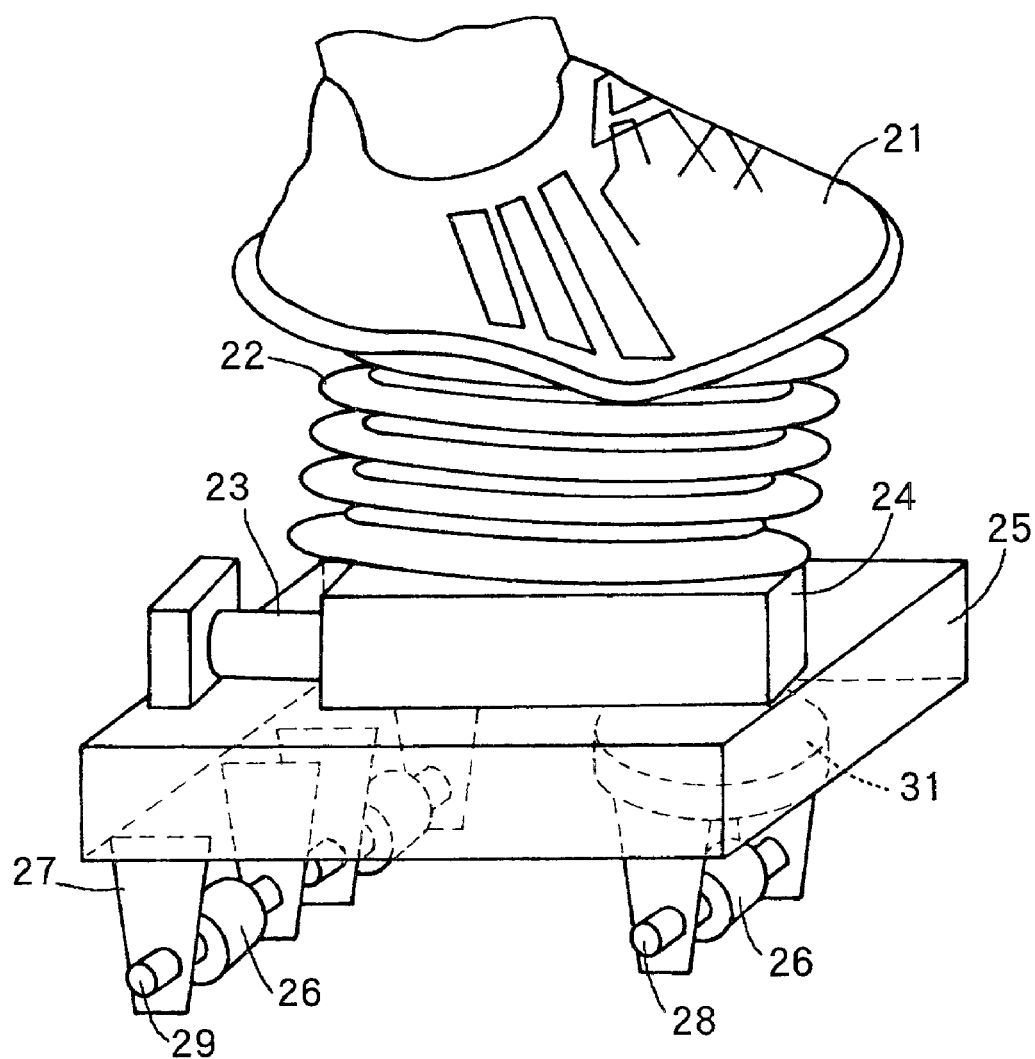
FIG. 14 is an explanatory view showing a roller skate employed in a eighth embodiment.

FIG. 14 is an explanatory view showing a roller skate as moving means and detecting means to detect the movement in the virtual space in the embodiment 8. Different features from the embodiment 5 are as follows: A rotating board 31 is arranged between the supporting board 25 and the roller 26 equipped with the encoder 28, and two rollers 26 equipped with motors 29 are arranged instead of one roller. By introducing the rotating board 31, the roller 26 equipped with the encoder 28 can change moving in different directions easily. By selecting different rotating numbers of rollers 26 equipped with motors 29, rolling directions can be changed flexibly.

Figure 15:
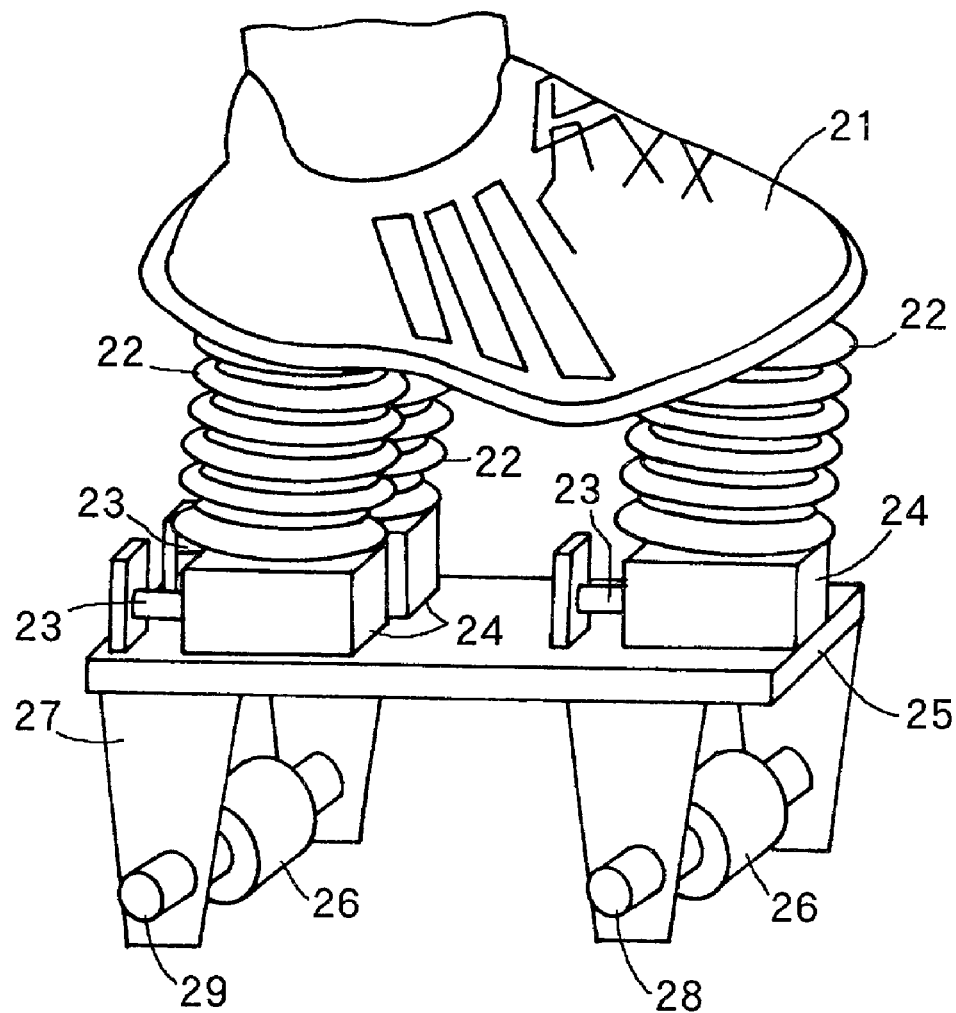
FIG. 15 is an explanatory view showing a roller skate employed in a ninth embodiment.

FIG. 15 is an explanatory view showing a roller skate as moving means and detecting means to detect the movement in the virtual space in the embodiment 9. A different feature from the embodiment 5 is as follows: Three sets of the bellows 22 for supporting the sports shoe 21 and the air pumps 23 are equipped so as to support the sports shoe 21 more adjustably according to the gradients of the sports shoe 21. This realizes a more realistic feeling during waking movements.

As described above, since the present invention attains easy operations such as moving, rotating, magnifying, and reducing images in the virtual space, even the novice operators can deal with images on the screen of the computer intuitively while observing data in the virtual space moving in the real space.

Since the present invention attains easy operations such as moving, rotating, magnifying, and reducing images in the virtual space, even novice operators can deal with images on the screen of the computer intuitively while observing data in the virtual space feeling moving as if in the virtual space.

What is claimed is:

1. A data processing system comprising:
   data accumulating means to accumulate virtual space data as a set of 3-dimensional data specifying shape,
   coordinate system setting means to set a virtual reference point and virtual coordinate axes in the virtual space,
   detecting means to detect a relative position and a gradient of said coordinate system setting means against a reference position in a real space,
   position specifying means to specify virtual positions in the virtual space in accordance with the position data detected by said detecting means,
   area selecting means to select a desired area in the virtual space in accordance with the virtual positions specified by said position specifying means, and
   storing means to store an image of the desired area selected by said selecting means,
   wherein said detecting means comprises a gyro-sensor.

2. A data processing system comprising:
   data accumulating means to accumulate virtual space data as a set of 3-dimensional data specifying shape,
   coordinate system setting means to set a virtual reference point and virtual coordinate axes in the virtual space,
   detecting means to detect a relative position and a gradient of said coordinate system setting means against a reference position in a real space,
   position specifying means to specify virtual positions in the virtual space in accordance with the position data detected by said detecting means,
   area selecting means to select a desired area in the virtual space in accordance with the virtual positions specified by said position specifying means, and
   storing means to store an image of the desired area selected by said selecting means,
   wherein said detecting means comprises an optical gyro-sensor and a plurality of velocity sensors.

3. A data processing system comprising:
   data accumulating means to accumulate virtual space data as a set of 3-dimensional data specifying shape,
   coordinate system setting means to set a virtual reference point and virtual coordinate axes in the virtual space,
   detecting means to detect a relative position and a gradient of said coordinate system setting means against a reference position in a real space,
   position specifying means to specify virtual positions in the virtual space in accordance with the position data detected by said detecting means,
   area selecting means to select a desired area in the virtual space in accordance with the virtual positions specified by said position specifying means, and
   storing means to store an image of the desired area selected by said selecting means,
   wherein said detecting means comprises:
      a laser light source,
      a plurality of galvano-mirrors to distribute the laser light,
      a plurality of prisms to reflect the distributed laser light,
      a photo-detector to receive the light reflected by said plurality of prisms, and
      angle detectors to detect respective moved angles of said plurality of galvano-mirrors.

4. A printer comprising:
   data accumulating means to accumulate virtual space data as a set of 3-dimensional data specifying shape,
   coordinate system setting means to set a virtual reference point and virtual coordinate axes in the virtual space,
      detecting means to detect a relative position and a gradient of said coordinate system setting means against a reference position in a real space, and
      printing means to print a desired area in the virtual space specified by the position data detected by said detecting means specified by the virtual reference point and coordinate axes,
   wherein said detecting means comprises a gyro-sensor.

5. A printer comprising:
   data accumulating means to accumulate virtual space data as a set of 3-dimensional data specifying shape,
   coordinate system setting means to set a virtual reference point and virtual coordinate axes in the virtual space,
   detecting means to detect a relative position and a gradient of said coordinate system setting means against a reference position in a real space, and
   printing means to print a desired area in the virtual space specified by the position data detected by said detecting means specified by the virtual reference point and coordinate axes,
   wherein said detecting means comprises an optical gyro-sensor and a plurality of velocity sensors.

6. A printer comprising:
   data accumulating means to accumulate virtual space data as a set of 3-dimensional data specifying shape,
   coordinate system setting means to set a virtual reference point and virtual coordinate axes in the virtual space,
   detecting means to detect a relative position and a gradient of said coordinate system setting means against a reference position in a real space, and
   printing means to print a desired area in the virtual space specified by the position data detected by said detecting means specified by the virtual reference point and coordinate axes,
   wherein said detecting means comprises:
      a laser light source,
      a plurality of galvano-mirrors to distribute the laser light,
      a plurality of prisms to reflect the distributed laser light,
      a photo-detector to receive the light reflected by said plurality of prisms, and
      angle detectors to detect respective moved angles of said plurality of galvano-mirrors.

7. An image recording system according comprising:
   data accumulating means to accumulate virtual space data as a set of 3-dimensional data specifying shape,
   coordinate system setting means to set a virtual reference point and virtual coordinate axes in the virtual space,
   detecting means to detect a relative position and a gradient of said coordinate system setting means against a reference position in a real space,
   position specifying means to specify virtual positions in the virtual space in accordance with the position data detected by said detecting means,
   area selecting means to select a desired area in the virtual space in accordance with the virtual positions specified by said position specifying means, and
   printing means to print the selected desired area in the virtual space,
   wherein a gyro-sensor is used in said detecting means.

8. An image recording system comprising:
data accumulating means to accumulate virtual space data as a set of 3-dimensional data specifying shape,
coordinate system setting means to set a virtual reference point and virtual coordinate axes in the virtual space,
detecting means to detect a relative position and a gradient of said coordinate system setting means against a reference position in a real space,
position specifying means to specify virtual positions in the virtual space in accordance with the position data detected by said detecting means,
area selecting means to select a desired area in the virtual space in accordance with the virtual positions specified by said position specifying means, and
printing means to print the selected desired area in the virtual space,
wherein an optical gyro-sensor and a plurality of velocity sensors are used in said detecting means.

9. An image recording system comprising:
data accumulating means to accumulate virtual space data as a set of 3-dimensional data specifying shape,
coordinate system setting means to set a virtual reference point and virtual coordinate axes in the virtual space,
detecting means to detect a relative position and a gradient of said coordinate system setting means against a reference position in a real space,
position specifying means to specify virtual positions in the virtual space in accordance with the position data detected by said detecting means,
area selecting means to select a desired area in the virtual space in accordance with the virtual positions specified by said position specifying means, and
printing means to print the selected desired area in the virtual space,
wherein said detecting means comprises:
  a laser light source,
  a plurality of galvano-mirrors to distribute the laser light,
  a plurality of prisms to reflect the distributed laser light,
  a photo-detector to receive the light reflected by said plurality of prisms, and
  angle detectors to detect respective moved angles of said plurality of galvano-mirrors.

10. An image recording method comprising steps of:
accumulating virtual space data as a set of 3-dimensional data specifying shape,
setting a coordinate system by setting a virtual reference point and virtual coordinate axes in the virtual space,
detecting a relative position and a gradient of the coordinate system against a reference position in a real space,
specifying virtual positions in the virtual space in accordance with the position data detected in said detecting step,
selecting a desired area in the virtual space in accordance with the virtual positions specified in said position specifying step, and
printing the selected desired area in the virtual space,
wherein a gyro-sensor is used in said detecting step.

11. An image recording method comprising steps of:
accumulating virtual space data as a set of 3-dimensional data specifying shape,
setting a coordinate system by setting a virtual reference point and virtual coordinate axes in the virtual space,
detecting a relative position and a gradient of the coordinate system against a reference position in a real space,
specifying virtual positions in the virtual space in accordance with the position data detected in said detecting step,
selecting a desired area in the virtual space in accordance with the virtual positions specified in said position specifying step, and
printing the selected desired area in the virtual space,
wherein said detecting step is performed using an optical gyro-sensor and a plurality of velocity sensors.

12. An image recording method comprising steps of:
accumulating virtual space data as a set of 3-dimensional data specifying shape,
setting a coordinate system by setting a virtual reference point and virtual coordinate axes in the virtual space,
detecting a relative position and a gradient of the coordinate system against a reference position in a real space,
specifying virtual positions in the virtual space in accordance with the position data detected in said detecting step,
selecting a desired area in the virtual space in accordance with the virtual positions specified in said position specifying step, and
printing the selected desired area in the virtual space,
wherein said detecting step is performed using:
  a laser light source,
  a plurality of galvano-mirrors to distribute the laser light,
  a plurality of prisms to reflect the distributed laser light,
  a photo-detector to receive the light reflected by the plurality of prisms, and
  angle detectors to detect respective moved angles of the plurality of galvano-mirrors.

13. A data processing system comprising:
data accumulating means to accumulate virtual space data as a set of 3-dimensional data specifying shape,
coordinate system setting means to set a virtual reference point and virtual coordinate axes in the virtual space,
virtual position detecting means to detect a relative position and a gradient of the coordinate system setting means against the virtual reference point,
moving means to move in the virtual space,
area selecting means to select a desired area in the virtual space in accordance with changed values caused by the moving action of said moving means detected by said virtual position detecting means, and
storing means to store an image of the desired area selected by said area selecting means,
wherein said moving means comprises:
  a plurality of rollers,
  a counting member to count a rotated amount of said plurality of rollers,
  a controlling member to control a rotating velocity of said plurality of rollers,
  a plurality of supporting members formed monolithically with said plurality of rollers to support a load,
  a measuring member to measure the load to said plurality of supporting members, and
  a space adjuster to adjust a space between said plurality of rollers and said plurality of supporting members in accordance with the measured load value measured by said measuring member.

14. A data processing system comprising:
data accumulating means to accumulate virtual space data as a set of 3-dimensional data specifying shape,
coordinate system setting means to set a virtual reference point and virtual coordinate axes in the virtual space, virtual position detecting means to detect a relative position and a gradient of the coordinate system setting means against the virtual reference point, moving means to move in the virtual space, area selecting means to select a desired area in the virtual space in accordance with changed values caused by the moving action of said moving means detected by said virtual position detecting means, and storing means to store an image of the desired area selected by said area selecting means, wherein said moving means comprises a second measuring member to measure the space between said plurality of rollers and said plurality of supporting members.

15. A data processing system comprising:

data accumulating means to accumulate virtual space data as a set of 3-dimensional data specifying shape, coordinate system setting means to set a virtual reference point and virtual coordinate axes in the virtual space, virtual position detecting means to detect a relative position and a gradient of the coordinate system setting means against the virtual reference point, moving means to move in the virtual space, area selecting means to select a desired area in the virtual space in accordance with changed values caused by the moving action of said moving means detected by said virtual position detecting means, and storing means to store an image of the desired area selected by said area selecting means, wherein said moving means detects a position in the virtual space.

* * * * *

UNITED STATES PATENT AND TRADEMARK OFFICE
CERTIFICATE OF CORRECTION

PATENT NO. : 7,031,017 B2
APPLICATION NO. : 09/752553
DATED : April 18, 2006
INVENTOR(S) : Tadashi Kaneko It is certified that error appears in the above-identified patent and that said Letters Patent is hereby corrected as shown below:

ON THE TITLE PAGE, AT ITEM (56), References Cited:
Other Publications, "Mar. 1, 2001." should read --Mar. 1, 2004.--.

ON THE TITLE PAGE, AT ITEM (57), Abstract:
Line 5, "communicate" should read --communicate with--.
Line 6, "execute" should read --executes--; and "attains" should read --attain--.

COLUMN 5:
Line 63, "(Hereinafter" should read --(hereinafter--.

COLUMN 9:
Line 11, "Kg. While" should read --Kg., while--.

COLUMN 12:
Line 51, "according" should be deleted.

Signed and Sealed this

Twenty-second Day of January, 2008

JON W. DUDAS
*Director of the United States Patent and Trademark Office*